United States Patent
Kurz et al.

[11] Patent Number: 5,874,496
[45] Date of Patent: Feb. 23, 1999

[54] ROUGH BIAXIALLY ORIENTED POLYESTER FILM FOR USE IN CAPACITORS

[75] Inventors: Rainer Kurz, Taunusstein; Herbert Peiffer, Mainz; Annegrete Bursch, Ruedesheim, all of Germany

[73] Assignee: Hoechst Diafoil GmbH, Charlotte, N.C.

[21] Appl. No.: 806,869

[22] Filed: Feb. 25, 1997

[30] Foreign Application Priority Data

Feb. 26, 1996 [DE] Germany ............ 196 06 956.4

[51] Int. Cl.$^6$ .................................................. B29C 55/00
[52] U.S. Cl. .................. 524/425; 264/290.2; 428/480; 524/430; 524/447
[58] Field of Search ............... 264/290.2; 428/480; 524/413, 425, 496, 444, 442, 430, 539, 447

[56] References Cited

U.S. PATENT DOCUMENTS

| | | | |
|---|---|---|---|
| 3,980,611 | 9/1976 | Anderson et al. | 260/40 |
| 4,590,119 | 5/1986 | Kawakami | 524/496 |
| 4,595,715 | 6/1986 | Kuze | 524/425 |
| 4,603,073 | 7/1986 | Renalls | 524/496 |
| 4,654,249 | 3/1987 | Barbey | 524/413 |
| 4,761,327 | 8/1988 | Hamano | 524/539 |
| 5,164,439 | 11/1992 | Sakamoto | 524/425 |
| 5,352,534 | 10/1994 | Hamano | 428/480 |
| 5,380,577 | 1/1995 | Hamano | 524/444 |
| 5,409,657 | 4/1995 | Gerwig | 264/290.2 |
| 5,434,000 | 7/1995 | Konagaya | 524/442 |
| 5,470,637 | 11/1995 | Sakamoto | 524/430 |

FOREIGN PATENT DOCUMENTS

A-423 402   4/1991   European Pat. Off. .

OTHER PUBLICATIONS

Abstract—JP–A–03 197 136 Toray Ind. Inc. (27.12.89).
Abstract—JP–A–63 141 308 Teijin KK (04.12.86).
Abstract—JPA–03 246 814 Diafoil KK (23.02.90).
Abstract—JP–A–63 72 531 Tokkyo Koho (02 Apr. 1988).
Abstract—J5 5158–619 Diafoil KK 30/05/79.

*Primary Examiner*—Paul R. Michl
*Attorney, Agent, or Firm*—Gregory N. Clements

[57] ABSTRACT

The invention relates to a biaxially oriented polyester film having a roughness, on at least one film surface, of $R_z$ greater than 1.0 $\mu$m ($R_a$ is greater than 0.1 $\mu$m), a dielectric strength (AC) greater than 220 kV/mm (the DC dielectric strength is greater than 500 kV/mm) and a migrating fraction in the film of less than 18 $\mu$S/cm based on a mass of added particles in a polyester volume of 100 cm$^3$. The film is particularly suitable for oil-impregnated capacitors.

21 Claims, No Drawings

ROUGH BIAXIALLY ORIENTED POLYESTER FILM FOR USE IN CAPACITORS

BACKGROUND

1) Field of the Invention

The present invention relates to rough biaxially oriented polyester films which contain finely divided, inorganic and/or organic particles, have good dielectric properties and are therefore very suitable for the production of capacitors. The present invention also relates to a polyester raw material used to make such a film. The invention relates in particular to polyester films which are suitable for the production of oil-impregnated capacitors.

2) Prior Art

Oil-impregnated capacitors are employed when high voltages are used, as required in the case of power capacitors. The films used for this purpose have a greater film thickness than those used, for example, in component electronics. The thickness range of films for the production of oil-impregnated capacitors is usually from 2.5 to 30 $\mu$m. For the stated applications, the films may be metallized or may be present as a film/foil laminate.

Oil-impregnated capacitors generally have the following advantages over capacitors not impregnated with oil the capacitance of the capacitor increases owing to the higher dielectric constant of the oil in comparison with air or a vacuum, the capacitance drift of oil-impregnated capacitors is smaller, with the result that the life of these capacitors is longer, and the operating voltages of oil-impregnated capacitors are generally higher.

According to the prior art, rough biaxially oriented polypropylene films are advantageously used for the production of oil-impregnated capacitors, owing to their low dielectric loss factor and their high dielectric strength.

The production of oil-impregnated capacitors with metallized plastics films or with film/foil laminates is most successful when the films can be readily wetted with oil or the windings or layer packets of layer capacitors can be readily impregnated with oil.

For good wetting of the film with oil and for good impregnation of the winding/capacitor, it is advantageous if the films used have a greater roughness than standard films (for example, packaging films, magnetic tape films or process films). In general, the roughness of standard films is of the order of magnitude of a few nanometers (nm), whereas roughnesses of the order of magnitude of a few microns ($\mu$m) are required for oil-impregnated capacitor films. If a standard film having little roughness is used for the impregnation of the capacitor with oil, the air entrained during winding of the films is only incompletely removed by the impregnating oil. The air remaining in the capacitor promotes local corrosion effects due to overvoltages, with the result that the dielectric strength and the capacitance of the capacitor are substantially reduced.

Suitable raw materials for film-based capacitors are in particular polypropylene and polyester. Impregnable, biaxially oriented polyester films are used for the production of capacitors in particular when higher heat stability or higher mechanical strength is required than with the use of polypropylene films. On the other hand, polypropylene has the advantage that great film roughnesses (in the $\mu$m range) can be obtained by suitable process engineering measures. Use is made of the fact that polypropylene can crystallize in two different crystal modifications which, when they are present side by side in the film, lead to increased roughness. In the production of biaxially oriented polyester films, roughnesses as high as polypropylene films cannot be obtained by process engineering measures.

According to the prior art, in the case of biaxially oriented polyester films, the great film roughness required for winding, further processing and impregnation is achieved by means of the addition of suitable inorganic and/or organic particles or particle systems in certain concentrations.

A document which describes this procedure for winding or for further processing of films is U.S. Pat. No. 3,980,611. According to the teaching of this publication, the film roughness and the film handling are improved by a combination of small (smaller than 1 $\mu$m), medium (from 1 to 2.5 $\mu$m) and large (from 2.5 to 10 $\mu$m) particles, it being necessary to fulfill certain ratios of film thickness to particle concentrations.

According to JP-A 03 917 136, films or laminated films having high dielectric strengths and small electrical capacitance drifts in the corresponding components are produced by the use of small particles, such as colloidal silica.

According to JP-A 63 141 308, from 1.4 to 16 $\mu$m thick films having good processibility and high dielectric strengths are produced by the combination of silicone resin particles with other inert particles.

According to JP-A 03 246 814, crosslinked polymer particles may also be used for capacitor film applications, and according to JP 88 033 290 inert particles having a molar P/Ca ratio of from 0.7 to 2.5 may also be used.

Furthermore, EP-A 0 423 402 discloses that high particle concentrations or large particle diameters lead to a greater level of vacuoles around the particles during orientation with the usual orientation ratios, owing to a relatively poor affinity between particle and polymer matrix. Corresponding vacuoles have an adverse effect on the mechanical film properties and on the dielectric strength of the films. In addition, a larger number of tears are caused during film production, leading to a deterioration in the productivity during film production.

Another method of obtaining rough polyester films having excellent processing properties, very good oil impregnability and very good electrical properties is described in JP-A 63 72 531. This document describes the production of rough oil-impregnable 12 $\mu$m thick films by an additional coating step in which a "swellable" silicate is applied.

All rough polyester films known to date have the disadvantage that the electrical properties of these films are poorer than the electrical properties of the polyester used for their production. This indicates that the electrical properties are impaired by the incorporation of additives, particles and other auxiliaries to the polyester raw material.

SUMMARY

It was therefore the object of the present invention to provide rough biaxially oriented polyester films for electrical insulation and for capacitor production, which have a number of advantageous properties and in addition can be very readily processed. The films should in particular:

be economically producible, have a high dielectric strength, have a roughness $R_z$ of >1.0 $\mu$m ($R_a$>0.1 $\mu$m)

be capable of being processed without creases and strains, have good oil impregnability, and have good long-term electrical properties.

In the broadest sense, this object is achieved by a biaxially oriented polyester film wherein:

- at least on one film surface, the roughness value $R_z$ is greater than 1.0 μm and the roughness value $R_a$ is greater than 0.1 μm,
- the AC dielectric strength is greater than 220 kV/mm (kilovolts/millimeter) and the DC dielectric strength is greater than 500 kV/mm, and
- the migrating fraction, based on the mass of the added particles in a polyester volume of 100 cm³ is less than 18 μS/cm.

The "migrating-fraction" of a film is a measure of the contamination of a film. A considerable contribution to this contamination is made by the particles incorporated in the film, which—depending on the method of production or working up—contain substances capable of migration. The substances capable of migration in the particles and hence in the film have a tendency to emerge from the film in the course of time, with the result that the electrical properties of the film and hence the capacitor become poorer. In particular, undesirable drifting of the capacitance is observed in this case. The proportion of substances capable of migration in the particles correlates with the conductivity of the particles; the purer the particles, the smaller the proportion of substances capable of migration and the lower the electrical conductivity of the particles. From the conductivity of the particles and with the knowledge of the particle concentration, it is possible to determine the conductivity and hence the "migrating fraction", i.e. the contamination of the polyester film.

In the broadest sense, the present invention also comprises: 1) one or more different polyesters, and 2) particles predominantly having a conductivity of less than 100 μS/cm and a mean particle diameter greater than 1.5 μm.

DETAILED DESCRIPTION OF THE INVENTION

The invention thus relates to an oriented polyester film which has a roughness, on at least one film surface, of $R_z$ greater than 1.0 μm, preferably greater than 1.1 μm and in particular greater than 1.2 μm ($R_a$ greater than 0.1 μm, preferably greater than 0.12 μm and in particular greater than 0.14 μm). This guarantees good impregnability with oil. If the surface roughness of the film is below the stated numerical values, the film, owing to its poor impregnability, is unsuitable for the production of oil-impregnated capacitors.

Furthermore, the AC dielectric strength of the film according to the invention is greater than 220 kV/mm, preferably greater than 230 kV/mm and in particular greater than 240 kV/mm (DC dielectric strength greater than 500 kV/mm, preferably greater than 530 kV/mm and in particular greater than 560 kV/mm).

The film preferably has a total thickness greater than 2.5 μm; it is in particular from 2.5 to 30 μm, preferably from 4 to 25 μm, thick.

The migrating fraction of the film according to the invention is less than 18 μS/cm, preferably less than 16 μS/cm, in particular less than 14 μS/cm, based on the mass of the added particles in a polyester volume of 100 cm³.

The invention also relates to a film raw material based on a polyester, which contains inorganic and/or organic particles, with the proviso that the purity and concentration of these particles is such that the migrating fraction of the film produced from this raw material is less than 18 μS/cm, based on the mass of the added particles in a polyester volume of 100 cm³. If the concentration of the particles used is low, e.g. 2000 ppm, it is possible to use a particle having relatively high conductivity (=high migrating fraction, lower purity) without the migrating fraction of the film exceeding the limit of 18 μS/cm according to the invention. On the other hand, however, the concentration of the particles cannot be reduced to any desired extent because the roughness of the film then decreases below the limit, according to the invention, of $R_z$>1.0 μm. In general, it has proven advantageous if particles having a conductivity of <100 μS/cm, preferably <90 μS/cm, particularly preferably <80 μS/cm, are used. The particle concentration of the inorganic and/or organic particles in the film is preferably more than 5000 ppm, particularly preferably more than 9000 ppm and in particular more than 13,000 ppm. The data are based on the cumulative weight of polymer and particles. Higher particle conductivities or lower concentrations are possible provided that the migrating fraction of the film remains below 18 μS/cm.

The particles used according to the invention may be both inorganic particles, for example of kaolin, alumina, silica, amorphous silica, pyrogenic silica and natural and precipitated calcium carbonate, and organic particles, for example of silicones, acrylates or epoxy resin compounds. Such particles are either commercially available in the required purity, such as, for example, pyrogenic silica (sold under the trademark ®Aerosil, by Degussa Co., Hanau Germany) or can be obtained by washing and/or purification of commercially available products. Very generally, suitable particles are those in which, by an appropriate procedure during the preparation, by the use of appropriately pure starting compounds or by subsequent washing and purification steps, the fraction of substances capable of migration is reduced and the conductivity of the corresponding particle suspensions is <100 μS/cm, preferably <90 μS/cm, in particular <80 μS/cm. Depending on the type of contamination, further measures for reducing migrating fractions may be: ignition, heating, combustion, degassing, precipitation or masking of cationic molecules by, for example, organophosphorus compounds. Combinations of the abovementioned methods are also suitable.

It is advantageous to use inorganic and/or organic particles having a mean particle diameter greater than 1.5 μm, preferably greater than 1.8 μm and in particular greater than 2.0 μm, so that the desired high roughness of the film surface can be achieved.

The particles may be either spherical or nonspherical. "Spherical" means that the particles have an aspect ratio of from 1 to 1.2. "Aspect ratio" is the quotient of the largest and the smallest particle diameter. Ideally, this is equal to 1. The aspect ratios are measured on particles in a prepared film and are accordingly not based on the aspect ratios of the free particles.

The width of the size distribution of the particles is not critical; thus, both monodisperse particles and particles having a corresponding size distribution may be used. "Monodisperse" means that the particles have a very narrow size distribution and ideally have no distribution at all. In the last-mentioned case, there is no longer a mean particle size since all particles have virtually the same diameter.

The particles may be primary particles, i.e. individual, nonagglomerated particles, or secondary agglomerated particles, i.e. particles agglomerated to form larger units. In the case of the agglomerated particles, the mean particle diameter is based on the mean diameter of the agglomerates.

The diameter of the particles and/or agglomerates as well as the aspect ratio and the monodispersity can be determined by measurement of electron micrographs at a resolution of from 3000 to 10,000.

Polyesters are understood as meaning in particular the polyester raw materials which comprise predominantly, i.e. to an extent of at least 80% by weight, preferably at least 90% by weight, a polymer selected from the group consisting of polyethylene terephthalate (PET), poly-butylene terephthalate (PBT), polyethylene naphthalate (PEN), poly-1,4-dicyclohexanedimethylene terephthalate (PCT), polyethylene naphthalate bibenzoate (PENBB) and blends of these polymers. Polyester raw materials which are preferably essentially composed of ethylene terephthalate units and/or preferably up to 30 mol % of comonomer units are preferred, a variation in the glycol and/or the acid component of the comonomer units being possible. The preparation of the polyesters can be carried out both by the transesterification process with the conventional catalysts, such as, for example, Zn salts, Ca salts, Li salts and Mn salts, or by the direct esterification process.

The film according to the invention is produced from a mixture of polyester with the particles.

The polyester raw material can be prepared by adding the particles before the beginning of the transesterification or after the end of the transesterification. The addition of the particles in the form of a glycolic suspension before the end of the transesterification is preferred. Alternatively, the particles can also be incorporated after the preparation of the raw material, by direct addition, blending, compounding or, for example, via master batches.

The biaxially oriented polyester film can be produced by known processes which need not be described in more detail, from raw material described above or a combination of the above raw material with other raw materials or conventional additives in conventional amounts of from 0.1 to not more than 10% by weight, with identically or differently formed surfaces. When other raw materials and/or additives are used, it is necessary to ensure that the electrical properties of the films produced are not adversely affected by these additives.

The films can be produced, for example, by a multistage orientation process, also with high degrees of orientation in one preferred surface direction or in both surface directions of the film, for example for the production of films having very good mechanical properties. Orientation processes with the sequence longitudinal-transverse, transverse-longitudinal, longitudinal-transverse-longitudinal, simultaneous longitudinal-transverse) and multiple orientation in one or both directions are also possible here.

Surprisingly, it has been found that the films according to the invention have a very high dielectric strength and can be produced without problems. Oil-impregnated capacitors which contain such films exhibit high constancy of the dielectric strength as a function of time, this being attributable to the small fraction of the substances capable of migration in the film.

The invention is now illustrated in more detail with reference to Examples. The following methods of measurement were used for characterizing the raw materials and the films:

SV value

To determine the SV value, a polyester sample is dissolved in a solvent (dichloroacetic acid). The viscosity of this solution and the viscosity of the pure solvent are measured in an Ubbelohde viscometer. The quotient of the two values is determined, 1,000 is subtracted from this and this value is multiplied by 1000. The resulting value is the SV value (specific viscosity).

Roughness

The roughness ($R_a$, $R_z$) of the film was determined according to DIN 4768, with a cut-off of 0.25 mm.

Dielectric strength

The AC and DC dielectric strength was measured according to DIN 53 481. 20 individual measurements were carried out to determine a value, the measuring conditions being 23° C. and 80% relative humidity. The electrode arrangement consisted of a ball and plate.

Electrical conductivity

The electrical conductivity (EC) of aqueous suspensions of particles was determined similarly to DIN ISO 787 Part 14 "General test methods for pigments and fillers". The measurements were carried out using the immersion cell and the indicator unit from Tacussel. The measurement frequency was 1 kHz. The climatic conditions were 23° C. and 50% atmospheric humidity. The sample preparation was carried out with 10 g of particles in a 250 ml beaker.

The particles were suspended in about 80 ml of cold water, brought to the boil with stirring (boiling time 5 min), cooled to about 60° C. and made up to 100 g with cold water. The batch was then stirred again.

Fraction capable of migration in the film

The fraction capable of migration in the film is a measure of the purity of the raw material used. The greater this value, the lower is the purity of the raw material. In the present case, this covers in particular the fraction of substances capable of migration which result from the particle used. The fraction capable of migration is determined for a constant volume of polyester film in an electrical component. The component volume is 100 cm³, corresponding to a film mass of about 140 g.

The fraction capable of migration (MF) in this volume element is thus proportional to the electrical conductivity of the particle used (EC) and the particle concentration (PC). The fraction capable of migration (MF) is calculated as follows $$MF\ [\mu S/cm] = EC\ [\mu S/cm] \cdot PC\ [-] \cdot 140/10$$

The factor 140/10 takes into account the polyester film mass in the volume element (140 g) and the mass of the particles in the measurement of the electrical conductivity (10 g).

In the Examples below, the particles were added after the end of the transesterification and the polycondensation was then carried out in the manner usual for polyesters, so that the polymer has an SV value of 810. Precipitated silica (sold under the trademark ®Sylobloc 44, from W. R. Grace Co.) was suspended in water, heated to about 60° to 80° C. and stirred for 1 hour. This process was repeated after decanting of the water, until the conductivity was <100 $\mu$S/cm.

EXAMPLE 1

17,000 ppm of an $SiO_2$ particle (Sylobloc 44, from Grace, purified as described above) having a mean particle diameter of about 3.3 $\mu$m and an electrical conductivity of 50 $\mu$S/cm were incorporated into the polyester raw material.

The polyethylene terephthalate polyester chips obtained were dried at 160° C. to a residual moisture content of 50 ppm and were processed via the process steps of extrusion, shaping of the melt in a sheet die to give a sheet-like melt film, cooling of this melt film on a take-off roll to give an unoriented film, longitudinal orientation, transverse orientation and winding to give a 12 $\mu$m thick biaxially oriented film. The conditions in the individual process steps were as follows:

| Extrusion | Temperature 300° C. | |
| --- | --- | --- |
| Longitudinal orientation | Temperature 85–135° C. | 3.8 |
| | Longitudinal orientation ratio | |
| Transverse orientation | Temperature 85–145° C. | |
| | Transverse orientation ratio | 4.0 |
| Fixing | Temperature | 230° C. |

The properties of this film are shown in the table below.

EXAMPLE 2

In comparison with Example 1, the film thickness was increased only to 19 μm.

Comparative Example 1

In comparison with Example 1, a kaolin having a mean particle diameter of about 1.5 μm and an electrical conductivity of 294 μS/cm was used. The particle content was 6000 ppm. The film has roughness values which are too low, so that the film can no longer be readily impregnated with oil.

Comparative Example 2

In comparison with Comparative Example 1, the film thickness was now increased to 19 μm. The particle content was 2000 ppm. In this case too, the roughness values are too low for good impregnation of the film with oil.

Comparative Example 3

In comparison with Comparative Example 2, the particle concentration is increased to 17,000 ppm. The film has the roughness values required for oil impregnation but the migrating fraction is too high.

Comparative Example 4

Particles of calcium carbonate (Hydrocarb 70) were now used. The particle diameter was 1.8 μm and the electrical conductivity of the particle was 150 μS/cm. The particles were added to the polyester raw material in a concentration of 5000 ppm. A 6 μm thick film was produced under the process conditions stated in Example 1. The roughness values achieved did not meet the requiremen set. When the particle concentration is further increased, impregnability is present but the migrating fraction is then too high.

Comparative Example 5

In comparison with Comparative Examples 1 to 4, a very pure but fine particle (Aerosil TT 600, electrical conductivity 20 μS/cm, secondary agglomerate size 0.3–0.6 μm) was now used, in a concentration of 5000 ppm.

The roughness values achieved were far short of meeting the requirements set. The film can no longer be impregnated with oil.

TABLE

| Example | Film thickness μm | Particle content ppm | Conductivity of the particles μS/cm | Fraction capable of migration, based on 100 cm³ of PET μS/cm | Roughness $R_z$ μm | Roughness $R_a$ μm | Dielectric strength DC/AC V/mm |
| --- | --- | --- | --- | --- | --- | --- | --- |
| E1 | 12 | 17,000 | 50 | 11.9 | 1.81 | 0.32 | 280/570 |
| E2 | 19 | 17,000 | 50 | 11.9 | 1.85 | 0.33 | 270/620 |
| CV1 | 12 | 2,000 | 294 | 8.3 | 0.3 | 0.05 | 300/620 |
| CV2 | 19 | 2,000 | 294 | 8.3 | 0.3 | 0.05 | 280/630 |
| CV3 | 12 | 17,000 | 294 | 70 | 1.95 | 0.31 | 200/400 |
| CV4 | 6 | 5,000 | 150 | 10.5 | 0.62 | 0.05 | 340/— |
| CV5 | 6 | 5,000 | 20 | 1.4 | 0.3 | 0.03 | 300/— |

— not determined

What is claimed:

1. A biaxially oriented polyester film which contains particles and
    whose roughness values $R_z$ and $R_a$ on at least one film surface are greater than 1.0 μm and greater than 0.1 μm, respectively,
    whose AC dielectric strength is greater than 220 kV/mm,
    whose DC dielectric strength is greater than 500 kV/mm, and
    wherein the migrating fraction, based on the mass of the added particles in a polyester volume of 100 cm³, is less than 18 μS/cm.

2. The biaxially oriented polyester film as claimed in claim 1, wherein the roughness value $R_z$ is greater than 1.2 μm.

3. The biaxially oriented polyester film as claimed in claim 1, wherein the roughness value $R_a$ is greater than 0.12 μm.

4. The oriented film as claimed in claim 1, wherein the AC dielectric strength is greater than 230 kV/mm.

5. The oriented film as claimed in claim 1, wherein the DC dielectric strength is greater than 530 kV/mm.

6. The oriented film as claimed in claim 1, wherein the migrating fraction is less than 16 μS/cm.

7. The oriented film as claimed in claim 1, wherein the particles have a mean particle diameter greater than 1.5 μm.

8. The oriented film as claimed in claim 1, wherein the film contains particles in an amount of more than 5000 ppm, based on the cumulative weight of polymer and particles.

9. The biaxially oriented polyester film as claimed in claim 1, wherein the particles are inorganic and/or organic particles.

10. The biaxially oriented polyester film as claimed in claim 1, wherein the total film thickness is at least 2.5 μm.

11. The oriented film as claimed in claim 1 which contains the particles in an amount of more than 9000 ppm, based on the cumulative weight of polymer and particles.

12. The oriented film as claimed in claim 11 wherein the mean particle diameter of the particles is greater than 1.8 µm.

13. The oriented film as claimed in claim 1 wherein the mean particle diameter of the particles is greater than 1.8 µm.

14. The oriented film as claimed in claim 1 which contains the particles in an amount of more than 13,000 ppm, based on the cumulative weight of polymer and particles.

15. The oriented film as claimed in claim 14 wherein the mean particle diameter of the particles is greater than 2.0 µm.

16. The oriented film as claimed in claim 15 wherein the particles have a conductivity less than 80 µS/cm.

17. The oriented film as claimed in claim 16 wherein the roughness value $R_z$ is greater than 1.2 µm, the roughness value $R_a$ is greater than 0.14 µm, the AC dielectric strength is greater than 240 kV/mm, the DC dielectric strength is greater than 560 kV/mm and the migrating fraction is less than 14 µS/cm, based on the mass of the added particles in a polyester volume of 100 cm$^3$.

18. The oriented film as claimed in claim 17 wherein the polyester is selected from the group consisting of polyethylene terephthalate, polybutylene terephthalate, polyethylene naphthalate, poly-1,4-dicyclohexanedimethylene terephthalate, polyethylene naphthalate bibenzoate and blends thereof.

19. The oriented film as claimed in claim 1 wherein the roughness value $R_z$ is greater than 1.2 µm, the roughness value $R_a$ is greater than 0.14 µm, the AC dielectric strength is greater than 240 kV/mm, the DC dielectric strength is greater than 560 kV/mm and the migrating fraction is less than 14 µS/cm, based on the mass of the added particles in a polyester volume of 100 cm$^3$.

20. The oriented film as claimed in claim 1 wherein the particles have a conductivity less than 80 µS/cm.

21. The oriented film as claimed in claim 1 wherein the polyester is selected from the group consisting of polyethylene terephthalate, polybutylene terephthalate, polyethylene naphthalate, poly-1,4-dicyclohexanedimethylene terephthalate, polyethylene naphthalate bibenzoate and blends thereof.

* * * * *